United States Patent [19]
Fehling et al.

[11] Patent Number: 5,625,273
[45] Date of Patent: Apr. 29, 1997

[54] BATTERY SAFETY DEVICE

[75] Inventors: John R. Fehling, New Hyde Park; Charles Meierdierck, Huntington Station; Donald F. Fagon, Mount Vernon, all of N.Y.

[73] Assignee: Bren-Tronics Inc., Commack, N.Y.

[21] Appl. No.: 366,833

[22] Filed: Dec. 30, 1994

[51] Int. Cl.$^6$ ........................................... H02J 7/00
[52] U.S. Cl. ..................... 320/13; 320/15; 320/32; 320/35
[58] Field of Search .......................... 320/13, 15, 17, 320/18, 31, 32, 33, 35; 361/92

[56] References Cited

U.S. PATENT DOCUMENTS

| | | |
|---|---|---|
| 3,648,145 | 3/1972 | Meyer et al. ............................ 320/13 |
| 4,005,344 | 1/1977 | Gaind et al. . |
| 4,017,779 | 4/1977 | McDonald et al. ..................... 320/15 |
| 5,073,837 | 12/1991 | Baek ...................................... 320/13 X |
| 5,177,426 | 1/1993 | Nakanishi et al. ..................... 320/13 |
| 5,179,337 | 1/1993 | Sternman et al. . |
| 5,477,124 | 12/1995 | Tamai ..................................... 320/13 |

OTHER PUBLICATIONS

Watts, MOSFET Replaces Swtich, EDN, p. 72 Feb. 13, 1994.

*Primary Examiner*—Peter S. Wong
*Assistant Examiner*—Patrick B. Law
*Attorney, Agent, or Firm*—Graham & James LLP

[57] ABSTRACT

A battery safety device and circuit which prevents detrimental effect from the three most common battery faults generally encountered, excessive heat generation, voltage reversal and short circuit problems. The device includes fast acting circuits which latch the battery in the off state until reset by removal of the load, thereby preventing continued cycling of the battery between on and off states. The safety device includes a gating transistor such as a MOSFET (metal-oxide semiconductor field-effect transistor) switch, a latching timer (RC circuit) and a latching circuit having a transistor which turns on when a charge is 0.5 volts or greater. The safety device further comprises one or more sensor switches triggered by predetermined thermal, pressure, etc., conditions, with the switches being outside the circuit (and not affected by circuit conditions) and adapted to provide a latching voltage to the gating transistor under a detected untoward condition.

9 Claims, 4 Drawing Sheets

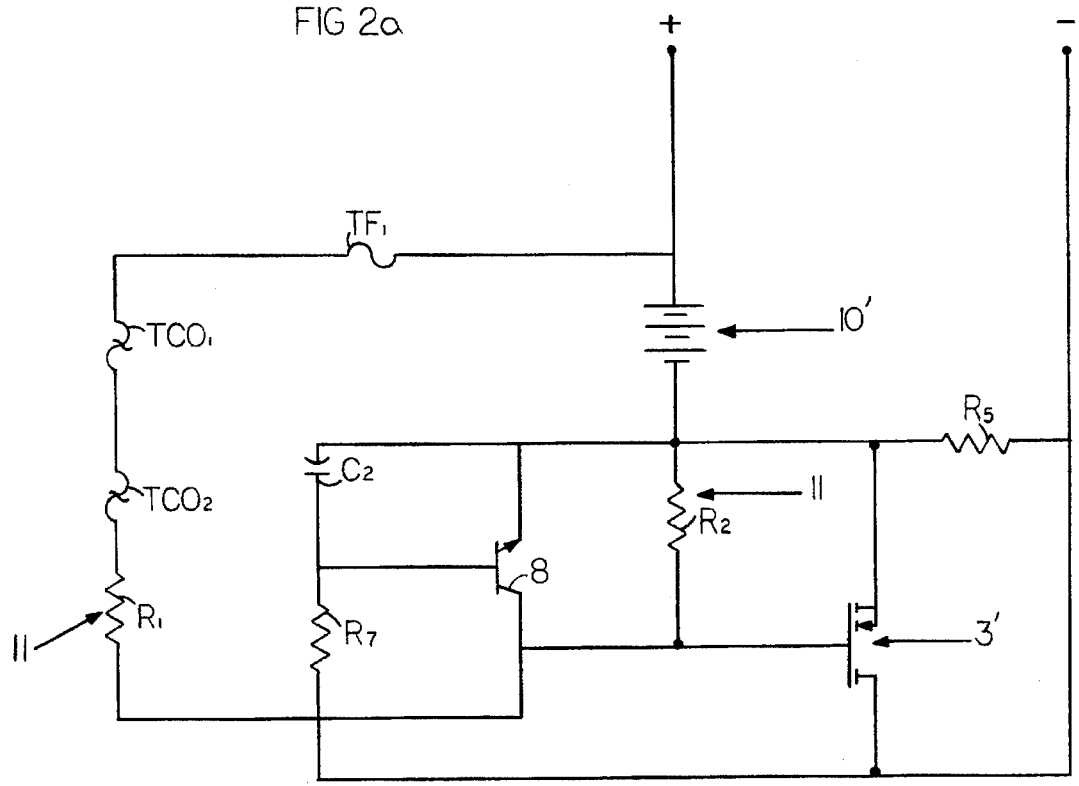

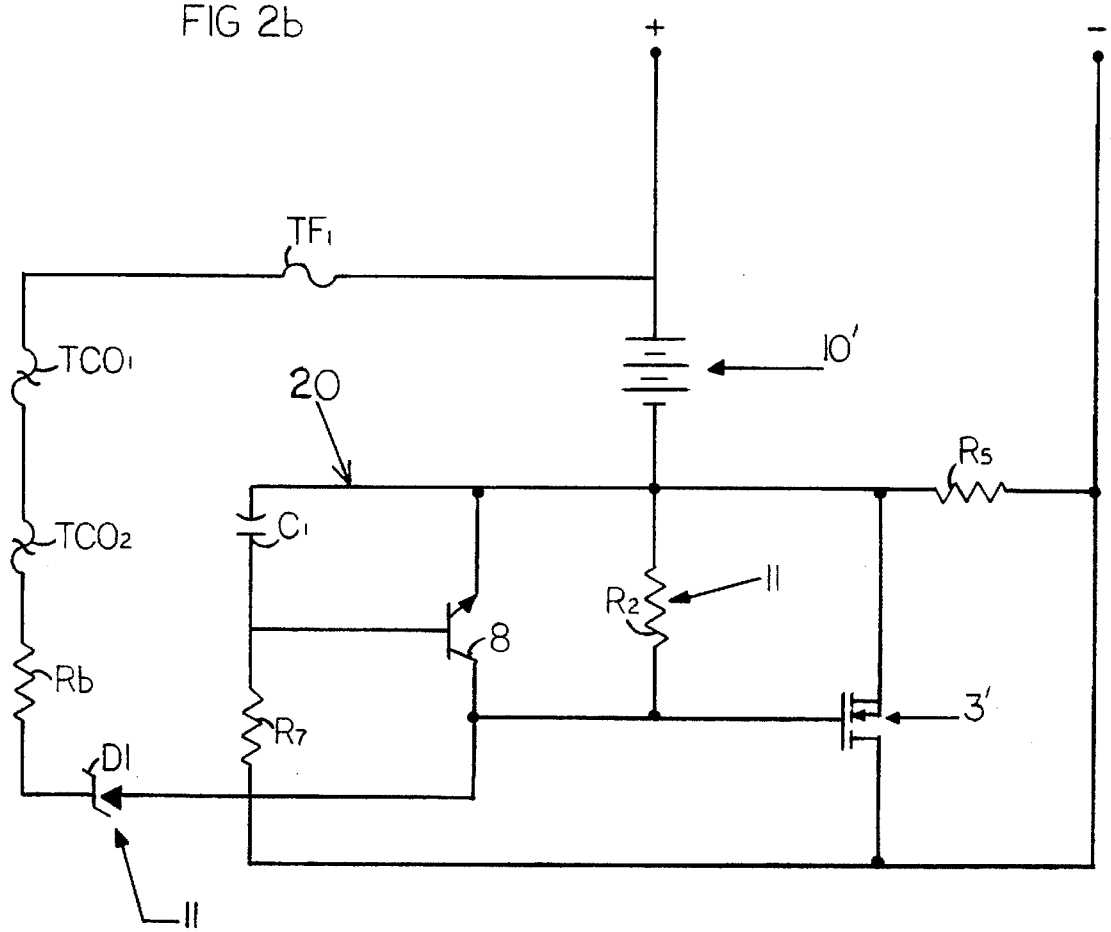

BATTERY SAFETY DEVICE

FIELD OF THE INVENTION

This invention relates to safety devices for electrochemical batteries and particularly to such safety devices having circuit cutoff means activated in response to untoward battery conditions.

BACKGROUND OF THE INVENTION

Various means and devices have been utilized with electrochemical cells and particularly electrochemical batteries to prevent untoward occurrences, when the battery is abused or subject to adverse conditions such as short circuiting, voltage reversal and heat generation. Safety devices such as fuses and thermal switches interrupt current flow and battery operation by opening up a switch in the circuit. However, such devices permit the battery to continue operating upon replacement of a fuse or cooling of the battery, even though the condition which caused the original heat generation remains.

Devices, including transistor gating elements such as MOSFETs (metal-oxide semiconductor field-effect transistors) have been utilized, e.g., U.S. Pat. No. 5,179,337, as switches, to turn off current upon the occurrence of an untoward condition, such as at low voltage which may affect rechargability and possible result in cell reversal. General use of the MOSFET type of cutoff safety device is predicated on there being only two conditions of either on or off (i.e. the circuit being fully broken or fully closed). However, a factor not taken into account with the use of MOSFETs is the fact that the MOSFET does not immediately shut down, i.e. being either in the on or off state. Instead, as the referenced threshold gate to source voltage is reached, the MOSFET changes resistance from a low resistance device to a resistive device and eventually to a very high resistance or open device. During this transition stage, the MOSFET heats up under the high currents with resultant damage if the dissipated power exceeds the chip capabilities.

It is therefore an object of the present invention to provide a safety device which shuts down the discharge of the battery and keeps it in the latched off mode until the load is removed.

It is a further object of the present invention to provide the safety device with thermal protection and sensor switches outside of the discharge circuit but within the gate circuit.

It is yet another object of the present invention to provide low voltage protection with latching, high temperature protection with latching and short circuit protection with latching.

These and other objects, features and advantages of the present invention will become more evident from the following description and drawings in which:

SHORT DESCRIPTION OF THE DRAWINGS

FIGS. 2a and 2b are circuit schematics of embodiments of the protection circuit of the present invention with and without a diode in the gate circuit;

SUMMARY OF THE INVENTION

Generally the present invention comprises a protection circuit for an electrochemical cell or a battery of electrochemical cells comprising a gating transistor such as a MOSFET which is latched by latching means into the open or off position, to shut down battery discharge, upon the occurrence of an untoward condition such as excessive heat, until reset by removal of the load, thereby preventing continued cycling of the battery between on and off states. The latching means comprise a gate circuit separate from the discharge circuit whereby discharge conditions do not affect the latching. Sensor switches such as thermal sensors are accordingly part of the gate circuit and not part of the discharge circuit. This differs from normal placement of these type of devices wherein they are placed in series with the battery. However, with such normal placement each device incurs voltage losses due to internal resistance effects, thereby affecting, among other things temperature accuracy in safety control. Placement of the sensor switches in the gate circuit permits the use of many thermal sensors throughout the battery without any effect on battery terminal voltage.

DETAILED DESCRIPTION OF THE INVENTION AND THE DRAWINGS

Figure 1:
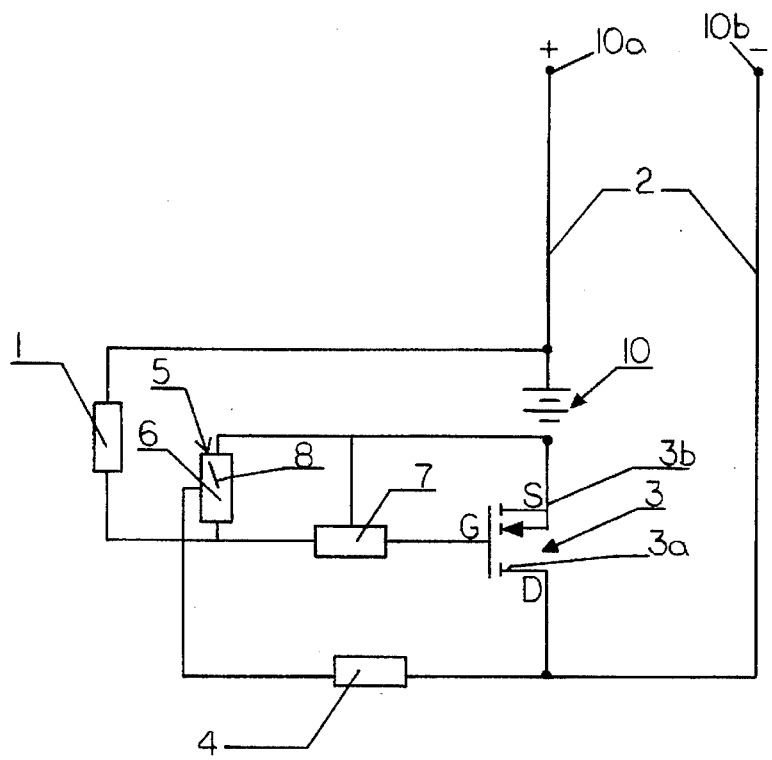
FIG. 1 is a schematic block diagram of the protective device circuitry of the present invention.

With reference to the drawings, in FIG. 1, a battery 10 is provided with a discharge circuit 2 in which MOSFET switch 3 is placed in series therewith. When the MOSFET 3 is in the open position, as shown, the battery circuit 2 is interrupted and discharge, with concomitant effects, is stopped. One or more thermal switch sensors 1, are placed at strategic and susceptible locations within the battery 10 to sense thermal conditions (if desired the thermal switches can be replaced by other types of sensors such as pressure sensors and the like, with similar effect). The thermal switch sensors 1 are placed in series with latching circuit 5, comprising a transistor 8 which turns on when the capacitor 6 in RC circuit, latching timer 4, charges to approximately 0.55 volts or greater, base to emitter voltage of the transistor. Battery 10 provides the requisite latching voltage via gate to source threshold voltage controller 7 to maintain the MOSFET 3 held in full conduction, thereby permitting continued discharge.

In operation, when the MOSFET 3 becomes resistive, the voltage between the drain 3a and source 3b rises and when it reaches a predetermined voltage, depending upon the particular battery being used, the gating voltage through controller 7 is driven towards zero volts, by transistor 8, thus turning off the MOSFET 3, with turn off time being on the order of milliseconds. Voltage from the drain to source rises to the battery voltage and remains at that level until the load is removed.

If a short circuit is placed across external battery contacts 10a and 10b, the short circuit current drives the drain to source voltage up to a level to turn on transistor 8 which will also effect the latching to open the MOSFET 3 and circuit 2.

With a thermal condition occurring, thermal switches 1 open, due to the heating, with precision, and with the gate voltage dropping to zero, thereby shutting off the MOSFET 3 and latching it.

In order to remove the latch on the MOSFET 3 under any of the aforementioned conditions, the load must be removed from the battery circuit 2.

Figure 3:
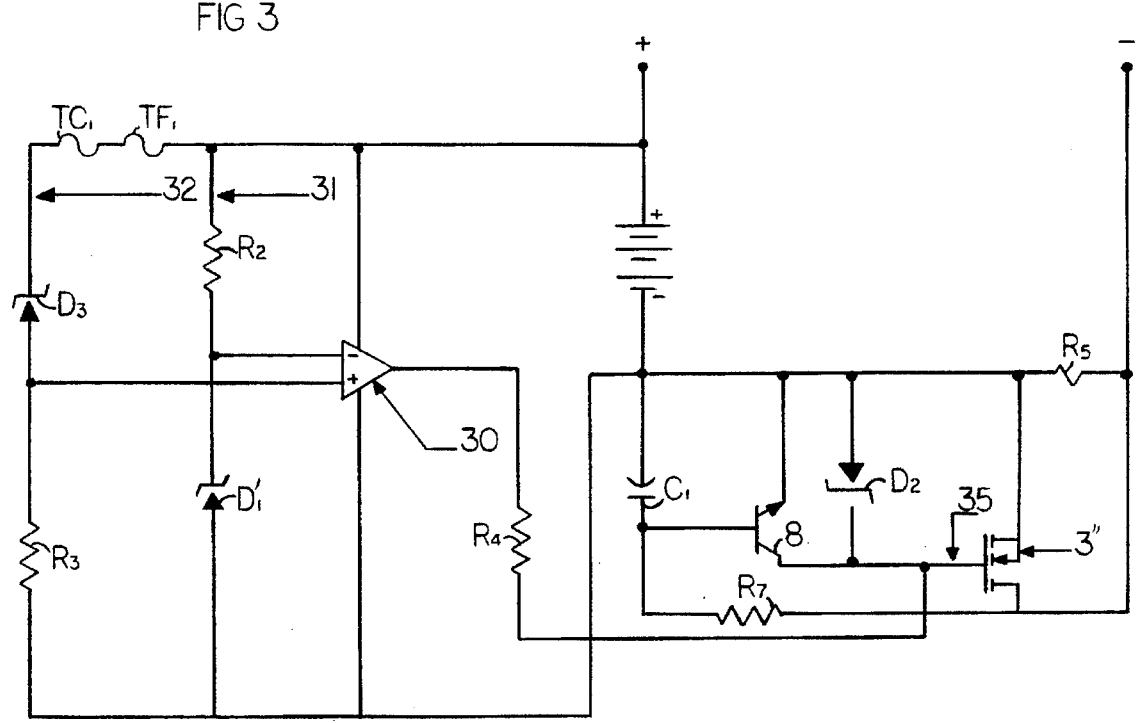
FIG. 3 is another embodiment of the protection circuit of the present invention.

The more detailed circuits shown in FIGS. 2a and 2b, incorporate voltage dividers 11 for a signal to turn the MOSFET 3' off. In FIG. 2b a reference diode $D_1$ is in series with the gate 20, whereby, as the battery voltage drops, the gate to source voltage drops, thereby turning the MOSFET 3' off. In FIG. 3, a voltage comparator 30 (or operational amplifier) is included in the circuit as the source of the signal used to turn the MOSFET 3" on or off.

With reference to the circuit of FIG. 2b, the positive voltage signal of the battery 10' is fed back to the gate of the MOSFET 3' and the voltage reference diode $D_1$ provides a constant voltage drop as the battery discharges. Residual voltage is applied across resistor $R_2$. When the voltage across resistor $R_2$ drops to a value less than the gate to source threshold voltage, the MOSFET 3' opens and the battery 10' turns off. Thereafter the open circuit voltage of the battery is across the source to drain of the MOSFET 3' Diode $D_1$ is selected according to the relationship of $V_{D1} = V_{cutoff} - V_{GSTH}$, wherein $V_{cutoff}$ is the desired cutoff voltage of the battery and $V_{GSTH}$ is the gate to source cutoff voltage.

In FIGS. 2a and 2b, thermal switches $TC0_1$ and $TC0_2$ and thermal fuse $TF_1$ are in the gate or latching circuit outside of the discharge circuit and are immediately operable to shut down the battery 10'. The fuse $TF_1$ works immediately and permanently to shut down the battery. Resistor $R_5$ provides a leakage path once the shutdown holding current is removed and the shutdown holding current is calculated as being the battery voltage/$R_7$ + the load resistance. Short circuit shutdown is at or less than one millisecond with resistor $R_7$ and capacitor $C_1$ rise time to 0.55 volts. Transistor 8 provides the latching of MOSFET 3' to shut off the discharge current and thereby shutting down the battery.

The circuit shown in FIG. 3 operates with the positive voltage signal of the battery being fed via two parallel paths 31 and 32 to the input terminals of the operational amplifier 30. A reference voltage $V_{D'1}$ is established to the inverting terminal of the operational amplifier by means of reverse biased diode $D'_1$. Dropping diode $D_3$ is also reverse biased with $V_{D3}$ across it. The residual voltage $V_{R3}$ in this path is dropped across resistor $R_3$. The residual voltage $V_{R3}$ is applied to the non-inverting terminal of the operational amplifier. When $V_{R3}$ is at a potential greater than $V_{D1}$ the operational amplifier is on, thereby producing an output to the gate circuit 35. The output signal is fed to the gate circuit through a series circuit comprising resistor $R_4$ and diode $D_2$. Diode $D_2$ is selected by a reverse voltage which exceeds the gate to source threshold voltage but is less than the operational amplifier output. Accordingly, as long as the operational amplifier is turned on, the MOSFET 3" remains in the full conduction on position. As the battery voltage drops, $V_{R3}$ eventually drops below $V_{D1}$, at which time the operational amplifier turns off with its output signal also being turned off. This results in the MOSFET 3" also being abruptly being turned off. The relation between the voltages involved is $V_{D1} + V_{D3} = V_{cutoff}$ where $V_{D1}$ is greater than or equal to $V_{D3}$.

In all of the illustrated embodiments of the present invention, thermal (or other ambient condition) switches are included in the gate circuit for the MOSFET (or similar controlling transistor) as opposed to such switches being in series with the cells, i.e., in the battery discharge circuit. As a result, any number of switches, at all strategic positions within the battery, can be utilized, without regard to parasitic voltage drops engendered by each switch. Similarly in the illustrated embodiments, the non-resettable thermal fuse(es) is (are) placed in the gate circuit and not in series with the cells of the battery. This placement avoids false trips caused by heat generation by the current passing through the fuse in a sealed environment. With the placement of the fuse or fuses in the gate circuit, internal heating is eliminated, since the current in the gate is negligible. As a result, in accordance with the present invention, even low profile, very low power fuses can be effectively utilized. In addition, reliability of the heat sensors is increased by the reduction of the current through them from ampere ranges to microampere ranges.

In operation, in the circuits illustrated, when the gate to source voltage is driven below the threshold voltage by any of the gate switches opening, or the low voltage detection operation, the MOSFET turns off. Immediately thereafter, the voltage between the source and drain rises to the battery open circuit voltage. When this happens, capacitor $C_1$ charges at a time constant determined by resistor $R_7$ and capacitor $C_1$. Latching transistor 8 then turns on, thereby creating a short between the gate and the source. When the load is removed or turned off, the capacitor $C_1$ discharges, transistor 8 turns off and the battery is ready for use.

In the event of a short circuit condition, the current through the MOSFET causes a voltage drop between the source and drain. Capacitor $C_1$ charges and when the charging voltage exceeds the turn-on voltage of the latching transistor 8, the circuit latches off until the short is removed.

With the protective circuit devices of the present invention, a low voltage cutoff, set within tight voltage ranges is utilizable (in the circuits of FIGS. 2a and 2b, within 2–4 volts of set voltage and with the circuit of FIG. 3, within ±0.25 volts of set voltage). Under high current conditions, the MOSFET devices of the prior art will heat up during transitioning between on and off states with possible resultant burnout of the MOSFET when used in multi-cycle rechargeable applications. The circuits of the present invention will go into a latched non-conductive state prior to this detrimental heating condition.

In order to illustrate the efficacy of the present invention, the following operational example of an untoward voltage reversal condition is presented. It is understood that such example is illustrative in nature and that details contained therein are not to be construed as limitations on the present invention.

EXAMPLE

Figure 4:
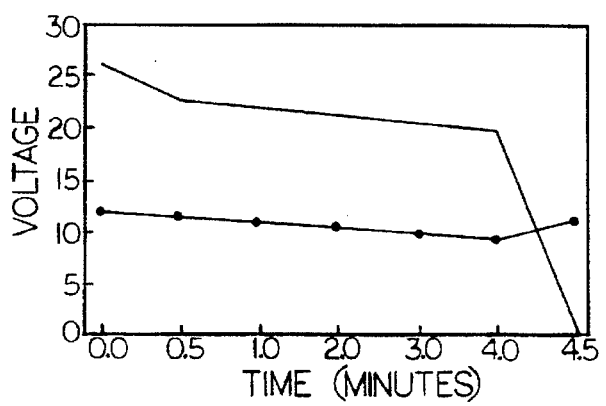
FIG. 4 is a discharge curve showing battery shut down with the device of the present invention under conditions of low voltage.

Two twelve volt rechargeable batteries are connected in series and discharged. Each battery contains the protective circuit device shown in FIG. 2a. One of the 12 V batteries is charged to 20% of capacity and the other of the 12 V batteries is charged to 100% of capacity. The voltage of the partially charged battery is monitored as is the total voltage of the two batteries in series, during said discharge. At about 19.7 volts, the battery series connection drops to 0 volts when the partially charged battery goes to 9.3 volts. Open circuit recovery voltage of the partially charged battery is 11.29 volts when the protective circuit device is activated. The discharge curve of the total battery terminal voltage and the partially charged battery is shown in FIG. 4, and is set forth in the following Table with relative voltages, as a function of discharge time, to the safety cutoff voltage of 9.30 of the partially charged battery.

TABLE

| Time (Minutes) | Battery Terminal Voltage | Partially charged battery voltage |
| --- | --- | --- |
| 0.0 | 28.19 | 12.18 |
| 0.5 | 22.70 | 11.58 |
| 1.0 | 22.35 | 11.32 |
| 2.0 | 21.48 | 10.88 |
| 3.0 | 20.81 | 10.32 |
| 4.0 | 18.73 | 9.30 |
| 4.5 | 0.00 | 11.29 |

It is understood that the above description and specific circuits described are only illustrative of the present invention and that changes in the circuits and components are possible without departing from the scope of the present invention as defined in the following claims:

What is claimed is:

1. A protection device for an electrochemical cell or battery of electrochemical cells, said device comprising a circuit having gating transistor and latching means, wherein the gating transistor is in series with a discharge circuit of said cell or battery, whereby under an untoward battery discharge condition, the gating transistor is latched by the latching means into an open, off position, to shut down battery discharge, until reset by removal of a load in the discharge circuit and wherein the latching means comprises a gate circuit separate from the discharge circuit whereby discharge conditions do not affect said latching, wherein said gate circuit comprises one or more thermal switches, said untoward battery discharge condition is excessive heat, and wherein the one or more thermal switches effect said latching.

2. The protection device of claim 1, wherein the gating transistor is a MOSFET.

3. The protection device of claim 2, wherein the gate circuit comprises a capacitor and a latching transistor having a turn-on voltage, and wherein, when said untoward battery discharge condition is a short circuit, the capacitor charges, and when charging voltage exceeds turn-on voltage of the latching transistor, the circuit latches off, until the short circuit condition is removed.

4. The protection device of claim 2, wherein said gate circuit further comprises a voltage comparator as a source of a signal to turn said MOSFET on or off.

5. The protection device of claim 2, wherein said gate circuit further comprises a voltage reference diode in series therein whereby as battery voltage drops, gate to source voltage drops, thereby turning said MOSFET off.

6. A method of protecting a battery of cells against detrimental effects of short circuit, voltage reversal and heat generation conditions from battery discharge conditions, said method comprising the steps of providing a transistor in the battery discharge circuit and providing said transistor with a gate circuit separate from said battery discharge circuit, said gate circuit comprising detector means for said short circuit, voltage reversal and heat generation conditions, and wherein said detector means trigger a signal in the gate circuit to latching means which latch said transistor in the open, off condition.

7. The method of claim 6, wherein said transistor is a MOSFET.

8. A method of protecting a battery of cells against detrimental effects of low voltage conditions from battery discharge conditions, said method comprising the steps of providing a transistor in the battery discharge circuit and providing said transistor with a gate circuit separate from said battery discharge circuit, said gate circuit comprising detector means for said low voltage, and wherein said detector means trigger a signal in the gate circuit to latching means which latch said transistor in the open, off condition and wherein said gate circuit is further provided with a voltage reference diode in series therein, whereby as battery voltage drops, gate to source voltage drops, thereby turning said transistor off.

9. The method of claim 8, wherein said transistor is a MOSFET.

* * * * *